United States Patent
Peterson et al.

(10) Patent No.: US 12,020,323 B2
(45) Date of Patent: Jun. 25, 2024

(54) SYSTEMS AND METHODS FOR COMPETITIVE PORTFOLIO TRADING

(71) Applicant: Tradeweb Markets LLC, New York, NY (US)

(72) Inventors: Justin Daniel Peterson, New York, NY (US); Christian Adam Bruner, New York, NY (US); Theodore Husveth, New York, NY (US)

(73) Assignee: Tradeweb Markets LLC, New York, NY (US)

( * ) Notice: Subject to any disclaimer, the term of this patent is extended or adjusted under 35 U.S.C. 154(b) by 0 days.

(21) Appl. No.: 17/458,869

(22) Filed: Aug. 27, 2021

(65) Prior Publication Data
US 2022/0067833 A1    Mar. 3, 2022

Related U.S. Application Data

(60) Provisional application No. 63/070,918, filed on Aug. 27, 2020.

(51) Int. Cl.
*G06Q 40/04* (2012.01)
*G06F 3/0482* (2013.01)

(52) U.S. Cl.
CPC .......... *G06Q 40/04* (2013.01); *G06F 3/0482* (2013.01)

(58) Field of Classification Search
CPC .............................. G06Q 40/04; G06F 3/0482
See application file for complete search history.

(56) References Cited

U.S. PATENT DOCUMENTS

| | | | |
|---|---|---|---|
| 7,499,883 B2 * | 3/2009 | Goldenberg | G06Q 40/06 705/37 |
| 7,860,796 B2 * | 12/2010 | Levy | G06Q 20/042 705/64 |
| 2004/0205018 A1 | 10/2004 | Degraaf et al. | |
| 2007/0083452 A1 | 4/2007 | Mayle et al. | |
| 2008/0005002 A1 | 1/2008 | Ferris | |
| 2010/0287091 A1 | 11/2010 | Toffey | |
| 2016/0196608 A1 | 7/2016 | Chiulli et al. | |
| 2017/0161829 A1 | 6/2017 | Mazier | |

OTHER PUBLICATIONS

Bloomberg Portfolio & Riskanalytics (Port) (Year: 2015).*
International Search Report and written opinion of the International Searching Authority (Nov. 4, 2021) in PCT/US2021/047862.
Ranasinghe et al. "A trading tool that's transforming the $10 trillion-plus corporate bond market." Jul. 28, 2020.

* cited by examiner

*Primary Examiner* — Aryan E Weisenfeld
(74) *Attorney, Agent, or Firm* — McCarter & English, LLP; Jeffrey Mann

(57) ABSTRACT

Various embodiments of the present invention provide systems and methods for portfolio trading of corporate bonds. Liquidity takers generate a list of bonds to send to liquidity providers where the liquidity provider provides quotes for one or more of the bonds. The decision to trade is made at the portfolio level and the winning dealer trades the portfolio or sub-portfolio.

13 Claims, 12 Drawing Sheets

| DEALER | TOTAL QUOTES | SELECTED QUOTES | NET PROCEEDS | W-AVG PX | DV01 WAS | VOLUME WAS | W-AVG YLD |
|---|---|---|---|---|---|---|---|
| | 18/18 | 18/18 | You receive $749,648 | 121.263 | 163.9 | 164.3 | 2.723% |
| | 18/18 | 18/18 | You receive $740,789 | 121.262 | 163.6 | 164.2 | 2.722% |
| | 18/18 | 18/18 | You receive $764,353 | 121.313 | 163.3 | 163.9 | 2.724% |
| | 17/18 | 17/18 | Not all selected items quoted | N/A | N/A | N/A | N/A |
| Common quoted items | | | | | | | |

FIG. 6A

| DEALER | TOTAL QUOTES | SELECTED QUOTES | NET PROCEEDS | W-AVG PX | DV01 WAS | VOLUME WAS | W-AVG YLD |
|---|---|---|---|---|---|---|---|
| | 18/18 | 17/17 | You pay $1,078,098 | 121.244 | 176.3 | 160 | 2.644% |
| | 18/18 | 17/17 | You pay $1,072,648 | 121.256 | 177.8 | 159.5 | 2.635% |
| | 17/18 | 17/17 | You pay $1,052,103 | 121.342 | 177.5 | 159.3 | 2.635% |
| | 17/18 | 17/17 | You pay $1,102,173 | 121.342 | 177.4 | 154.8 | 2.633% |
| Common quoted items | | | | | | | |

SYSTEMS AND METHODS FOR COMPETITIVE PORTFOLIO TRADING

CROSS-REFERENCE TO RELATED APPLICATION

This application claims the benefit of Provisional Application Ser. No. 63/070,918, filed Aug. 27, 2020, entitled "Systems and Methods for Competitive Portfolio Trading", the entire disclosure of which is hereby incorporated by reference.

BACKGROUND

Portfolio trading has existed in equities for many years, although it is relatively new to the corporate bond market, where the digitization of larger-size "block" trades has been persistently slow. According to Greenwich Associates, in July 2019 only 30% of the US investment grade credit market was traded electronically. But while those headline numbers might suggest a market in stasis, the reality is very different.

This is due, in part, to transformation on the peripheries of corporate bond cash markets. The recent growth of fixed income ETF assets—which, according to reporting by the Wall Street Journal in July 2019, now exceeds $1 trillion under management—has prompted significant increases in daily volume across line items to spur the create and redeem process. This has also been aided by the entrance of non-traditional market-makers and the maturation of all-to-all trading, which has included the blending of traditionally separate liquidity silos such as the dealer-to-dealer or retail markets.

In response, market-makers have sharpened their capabilities. There are now numerous dealers and liquidity providers that can algorithmically price thousands of bonds substantially in real-time.

In the prior art systems, market participants exchanging baskets of multiple bonds would assemble spreadsheets of bonds and prices, which were then emailed back and forth to liquidity providers. It is a painstaking process of iteration that could take more than a day to complete. The process might look something like this, a buy-side participant (liquidity taker or client) e-mails spreadsheets containing desired bonds and sizes/directions to multiple liquidity providers. The buy-side participant contacts liquidity providers via phone or chat and asks them to quote back via spreadsheet at a specified time. Once those quotes are received in the various spreadsheets, the liquidity taker would have to then combine the spreadsheets to compare the quotes and decide: (1) whether the quotes from the various dealers are good enough to trade, (2) which dealer had provided the best quote, (3) if there are some items that they want to remove from the portfolio, (4) if they would like dealer(s) to requote any items, and (5) if there seem to be any erroneous quotes. After some potential negotiation (via phone or chat), when the winning dealer is chosen, the liquidity taker would inform the winning dealer that they won (via phone or chat). The liquidity taker and liquidity provider then would have to book the trades. In many portfolio trades, this can be upwards of 500 single trades to book. Booking these trades from a spreadsheet that may have been passed back and forth several times and edited to different states on each side could cause trades to be booked in error or with the wrong prices. Often liquidity takers prefer to trade portfolios on spread to U.S. Treasury bonds. In those instances, trading hundreds of corporate bonds with several different Treasury benchmarks could be challenging. Liquidity takers would also have to communicate not just with the winning dealer, but with all the other liquidity providers in the transaction. Compiling and sharing information about whether they traded, whether dealers' prices were competitive, etc. would take up more valuable time and in some instances may be impossible to determine.

In view of the deficiencies in the prior art a need exists for an improved method and system for portfolio trading that creates a more efficient and accurate, system and method for pricing, negotiation and trading of corporate bonds.

SUMMARY

Various embodiments of the present invention provide systems and methods of portfolio trading for corporate bonds. Inflows and outflows, the changing view of credit research analysts, transition management, etc. could all prompt a situation in which significant trading flow needs to be moved quickly and efficiently. Embodiments of the invention allow for complex block trading and speedy risk transfer. Execution efficiency is improved, for example, by allowing institutions to package multiple bonds into a single basket, negotiate a portfolio level price with liquidity providers including banks and principal trading firms, and execute them in a single transaction.

In some embodiments, electronic portfolio trading is provided for credit bonds, allowing users to trade large lists of buys and/or sells typically directed to a designated portfolio trader, and view aggregate level pricing and analytics on the whole package of trades. Electronic portfolio trading can, for example, provide better liquidity, reduce the risk of human error, ensure a more efficient information exchange, and streamline Excel-based workflow.

Embodiments of the present invention can allow users to achieve fast and efficient execution on a large notional trade comprising multiple bonds; view aggregate level information on the whole package; evaluate spread/prices for hundreds of line items; reduce the risk of human error inherent in an Excel-based workflow; minimize information leakage by sending orders directly to a designated portfolio trader; and/or gain additional insights by running a pre- and post-trade Transaction Cost Analysis on a portfolio.

In some embodiments, portfolio trading systems and methods are provided for trading bonds including, but not limited to: European, U.S. Investment Grade (IG), U.S. High Yield (HY), and Emerging Markets and for trading in multiple currencies.

In some embodiments, multi-directional trades are supported (i.e., both buys and sells in a single list).

In some embodiments, multiple dealers can be included for competitive pricing and meeting users' best execution requirements.

In some embodiments, users can trade all portfolio items in a single trade, or just a portion of the portfolio.

In some embodiments, analytics include, but are not limited to: total proceeds, weighted average price and yield, composite difference, dollar duration ("DV01").

One embodiment provides for a computer-implemented method for electronic portfolio trading of corporate bonds using a computer system capable of communication with one or more client computers and one or more dealer computers across a trading platform where the method comprises causing to display on the client computer a pre-trade interface, the pre-trade interface designed and configured to receive one or more inputs related to one or more bonds that comprise a portfolio; receiving through the pre-trade interface a request from a client, the request comprising data relating to a portfolio; generating through the trading platform a portfolio list based on the data received from the client; transmitting through the trading platform the portfolio list to the one or more dealer computers; receiving through the trading platform from the one or more dealer computers quotes relating to one or more of the bonds that comprise the portfolio; causing to display on the client computer a negotiation interface, the negotiation interface designed and configured to display the portfolio list and pricing data based on the received quotes and to dynamically provide updated pricing information for the portfolio list based on inputs received from the client, wherein when a client deselects an item from within the portfolio list the pricing data is dynamically updated in real time to reflect a sub-portfolio that comprises each of the items in the portfolio list other than the deselected item; receiving through the trading platform a request to trade the items in the sub-portfolio from the client computer based on a selected dealer's quotes; and executing a transaction through the trading platform for the sub-portfolio between the client and selected dealer.

In one embodiment the portfolio list is generated based on data from the trading platform. In one embodiment the data relating to the portfolio includes a listing of one or more dealers and/or a desired timing related to a trade. In one embodiment the pricing data comprises one or more of the following: net proceeds, weighted average spread, weighted average price and weighted average yield.

One embodiment provides for a non-transitory computer program product, comprising a computer usable medium having stored therein instructions that, when executed by at least one processor, configure one or more computers of an electronic trading system to display on a client computer a pre-trade interface, the pre-trade interface designed and configured to receive one or more inputs related to one or more bonds that comprise a portfolio; receive through the pre-trade interface a request from a client, the request comprising data relating to a portfolio; generate through a trading platform a portfolio list based on the data received from the client; transmit through the trading platform the portfolio list to the one or more dealer computers; receive through the trading platform from the one or more dealer computers quotes relating to one or more of the bonds that comprise the portfolio; cause to display on the client computer a negotiation interface, the negotiation interface designed and configured to display the portfolio list and pricing data based on the received quotes and to dynamically provide updated pricing information for the portfolio list based on inputs received from the client, wherein when a client deselects an item from within the portfolio list the pricing data is dynamically updated in real time to reflect a sub-portfolio that comprises each of the items in the portfolio list other than the deselected item; receive through the trading platform a request to trade the items in the sub-portfolio from the client computer based on a selected dealer's quotes; and execute a transaction through the trading platform for the sub-portfolio between the client and selected dealer.

Additional features and advantages of the present invention are described further below. This summary area is meant merely to illustrate certain features of embodiments of the invention, and is not meant to limit the scope of the invention in any way. The failure to discuss a specific feature or embodiment of the invention, or the inclusion of one or more features in this summary area, should not be construed to limit the invention as claimed.

BRIEF DESCRIPTION OF THE DRAWINGS

The foregoing summary, as well as the following detailed description of certain embodiments, will be better understood when read in conjunction with the appended drawings, in which there are shown certain preferred embodiments wherein like reference numerals refer to like components. It should be understood, however, that the invention is not limited to the precise arrangements, structures, features, embodiments, aspects, systems, and instrumentalities shown and that the arrangements, structures, features, embodiments, aspects, systems, and instrumentalities shown may be used singularly or in combination with other arrangements, structures, features, embodiments, aspects, systems, and instrumentalities. The drawings are not in any way intended to limit the scope of this invention, but merely to clarify one or more embodiments of the invention. In the drawings:

FIGS. 6A and 6B illustrate examples of selections from the summary area of a portfolio trading negotiation interface according to certain embodiments of the present invention;

FIGS. 7-10 highlight different areas the interface of FIG. 4;

DETAILED DESCRIPTION

Various embodiments of the present invention provide electronic portfolio trading capabilities for corporate bonds. These capabilities include, for example, the ability to package multiple bonds into a single basket of buys and sells, negotiate a portfolio level price, and execute the trade in a single electronic transaction.

Electronic portfolio trading advances this process, by integrating powerful electronic tools with an easy to use interface. In addition, in various embodiments, traders can use real-time reference pricing from the trading platform, such as that provided by a pricing algorithm (e.g., Ai-Price), to inform where each bond—and the basket itself—should price; use net-spotting to reduce hedging costs after execution; and iterate with their liquidity provider on price through a seamless, instant interface, which removes the need to exchange spreadsheets back and forth.

One benefit of portfolio trading is efficiency. Electronically executing a portfolio trade removes several layers of manual busywork from the trading workflow as compared to list trading, where each individual CUSIP is looked at one by one, the right counterparty is sought for each and in many cases are manually traded over the phone.

In addition, portfolio trading functionality according to embodiments of the present invention allows institutional clients to submit a portfolio trade to multiple liquidity providers simultaneously, or to a single liquidity provider. By controlling the number of counterparties exposed to the trade, market participants are able to balance the potential for price improvement against the risk of disclosing potentially market-moving information to multiple parties.

Another benefit of the portfolio trading approach is the ability to spread risk by packaging illiquid bonds alongside highly liquid securities in a single portfolio.

Specific trading scenarios in which advantages can be realized according to certain embodiments of the present invention include, but are not limited to, large outflow in a fund(s) that must raise a certain amount of cash quickly, large inflow in a fund(s) that must buy a certain amount of bonds quickly, a portfolio manager/research analyst that has specific views on tickers/sectors that has created a list of buys and/or sells, a transition management agenda (e.g., selling IG and buying HY) and a large portfolio including illiquid bonds are being asked to sell or buy.

Figure 1:
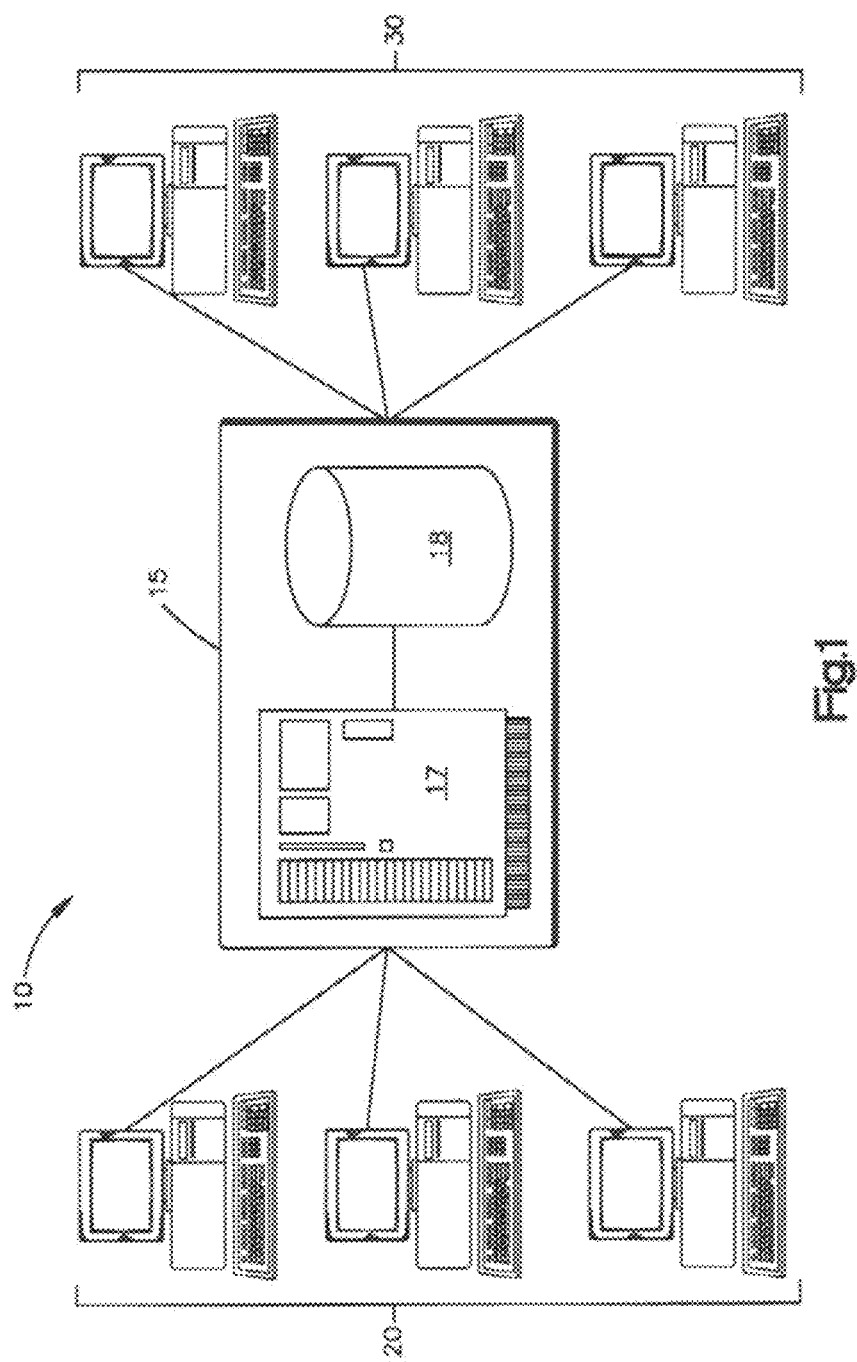
FIG. 1 is a diagram of an exemplary embodiment of a trading platform in accordance with one embodiment of the present invention.

In one embodiment, with reference to FIG. 1, a technical solution is provided in the form of an electronic trading platform 10 in which a buy-side participant (client) using a client computer can transmit a request for quote(s) from one or more dealers (liquidity providers) for a portfolio of corporate bonds. Generally speaking, the electronic trading platform 10 comprises a centralized computer system 15, including one or more computers or servers (e.g., page server, list server) and related storage devices for receiving transmitting and storing data related to the negotiation and trading of the bonds and the portfolio.

As shown in the exemplary embodiment of FIG. 1, a preferred embodiment of a centralized computer system 15 generally comprises one, or more computer systems 17 and databases 18 and related database management systems. One skilled in the art will recognize that the computer systems may as a matter of design choice include any number and configurations of computers and databases, which may be used separately or in tandem to support the traffic and processing needs required for operation at one time. If multiple computers are used, the computers may be configured using a round-robin configuration to handle end user traffic.

The centralized computer system 15 is communicatively interconnected to a local area network (not shown), on the one hand, and communicatively connected to a wide area network (shown generally by the interconnecting lines in FIG. 1), on the other hand, to a plurality of client and dealer computers 20, 30. In this way, the centralized computer system 15 can receive electronic messages to and from the client and dealer computers 20, 30 and transmit said messages to the appropriate recipient. Preferably, messages will be written in FPML and sent via MQ and FIX. Internally, the centralized computer system 15 is interconnected in order to process and store information related to the trading and negotiation as further detailed below. In an exemplary embodiment, a computerized electronic trading system and method includes a plurality of user computers through which the clients and dealers can price, negotiate and process their trades.

Various servers and other computer systems described herein include such art recognized components as are ordinarily found in server systems, including but not limited to processors, RAM, ROM, clocks, hardware drivers, associated storage, and the like. One skilled in the art will recognize, however, that because multiple users may be accessing such server at any given time it may become preferable to utilize multiple servers and databases, which may be used separately or in tandem to support the systems' traffic and processing, such as, by way of non-limiting example, a round-robin configuration utilizing multiple server systems. Client and dealer computers 20, 30 can be personal computers including at least a network adapter and web browsing capability, but may also include mobile and handheld devices, or other wireless devices. Furthermore, in certain embodiments, user computers can be network systems having components such as servers, databases, etc. Moreover specialized computers, servers, software or hardware may be utilized to carry out one or more of the functions described herein. In a preferred embodiment, centralized computer system 15 is programmed with computer program code comprising a plurality of programming modules and sub-components.

It should be noted that although the embodiments described may use multiple software modules for performing the various functions of the system, other embodiments could be implemented using any number of modules, with any single module incorporating the functions of several, or all, of the modules. The precise design of the software and the programming language used may be designed differently within the scope of the present invention. The software modules can be created using art recognized programming languages, including but not limited to Python, C++, ASP, Java, C#, ASP.NET, or PHP or any combination of known or later developed programming languages that allow the functionality described.

It will also be understood that, although the various embodiments of the present invention described herein are being described in terms of web-based centralized server architecture, a thin client, fat-client, or peer-to-peer type arrangement could be substituted for the system architecture described herein and are within the scope of the present invention. Additionally, the programming described herein can be stored in a machine readable form on a computer readable medium, such as a CD-ROM or DVD, and distributed to users for installation on user computers. Alternatively, such programming can be downloaded via a network. In either embodiment, communication with the system may be effected across known networks, such as the Internet.

Interaction between market participants is preferably achieved across an electronic marketplace (i.e., trading platform), which may consist of various computers which run applications dedicated to several functions such as market creation and management (e.g., order book management, market data dissemination, trading protocol management, information storage, etc.). One example of such an electronic marketplace has been described, for example, in U.S. Pat. No. 7,433,842, entitled METHOD AND SYSTEM FOR EFFECTING STRAIGHT-THROUGH-PROCESSING OF TRADES OF VARIOUS FINANCIAL INSTRUMENTS, which issued Oct. 7, 2008 and was filed Mar. 25, 2004 as U.S. patent application Ser. No. 10/808,820, the entirety of which is incorporated herein by reference.

In an exemplary embodiment, the system architecture of the computerized system and method includes hardware, system software and application software. The system hardware may include one or more mainframe computers each having at least one processor and memory. The system hardware may additionally include other components such as storage and network components (i.e., servers, routers, switches, data buses, databases, etc.), networked to the mainframe computer and any external connections as would be understood by a person of ordinary skill in the art having the benefits of the present disclosure. The system preferably includes one or more computer systems that can include one or more software modules, databases and related database management systems. Client computers can also typically connect to or include an order management system ("OMS") to assist in the execution and trading of securities. Various input and output devices are preferably provided with the client computers 20 and dealer computers 30 including, by way of non-limiting example, a display (e.g., liquid crystal display (LCD)), and an input device (e.g., a keyboard, mouse, touch pad, or light pen). Preferably, an Application Programming Interface ("API") is used to connect the dealer and client to the electronic trading system and perform certain tasks automatically. For example, an API may be utilized by client to connect their system with the electronic trading system for the purpose of sending orders which can eventually be converted for the dealer. Dealers may connect via an API for the purpose of providing the trading system with price information, for example by having an automated dealer trading system communicatively coupled to the trading system. The client and dealer computers would also preferably include a storage device such as, for example, a magnetic disk drive and magnetic disk or other equivalent device. The specific hardware combination/configuration is not crucial to the instant invention, and may vary as a matter of design choice within the functional parameters disclosed herein. Users (clients, dealers, and traders) of the trading system typically interact with the Graphical User Interfaces ("GUI's") displayed by the software modules by "clicking" on numbers or graphics (e.g., buttons) that are displayed on the GUI's. Persons of skill in the art will understand that the present invention is not limited to clicking with a computer mouse or any of the above listed hardware or software modules, but includes use of any other device for indicating an action with graphics-based software and other hardware and software arrangements.

Two long-term impacts of portfolio trading on the marketplace in terms of risk transfer and illiquid bonds are described below.

Risk transfer: Portfolio trades are exchanged on the basis of a single price for the basket, regardless of the size of that basket or the line items it includes. In that respect, a participant is deciding less on prices for each underlying CUSIP, and more based on the consolidated risk. A market more acclimated to, and more robust for, risk transfer is an important development for investment grade and high yield market as can be appreciated by one of ordinary skill in the art.

Illiquid securities: As more participants are trading/pricing based on overall portfolio risk profile as opposed to pricing trading on each individual bond, and therefore broaden their horizons on what to buy and sell, prices are established for less liquid securities that might not have normally been executed in an all-to-all market. By establishing a more regular pattern of prices for certain illiquid securities, it becomes clearer to predict where those securities may trade again. In time, it is feasible that portfolio trading may help to ameliorate price formation in thinly traded securities, and in turn expand the investible universe of corporate bond securities.

Portfolio trading is often confused with list trading. A common misconception about portfolio trading is that it is simply large, multi-line item trades and lists are just significantly smaller. However, portfolios may trade, for example, with fewer than 10 lines or more than 300 (e.g., up to 800). The concrete difference between the two is the "all at once" execution with one dealer that defines portfolio trading. It's the way the transaction is structured and the specific benefits a trader desires around exchanging risk that determines which protocol to use. Table 1 shows key differences between a list trade and a portfolio trade.

TABLE 1

| | List | Portfolio Trade |
|---|---|---|
| Market Reach | Wide | Discreet |
| # of Counterparties in Negotiation | As many as you like | One or select few |
| Trading partners | Trading desks | Dedicated Portfolio desk |
| Price | For each line item/ Non-contingent | All items priced/ Contingent |
| # of Executing Counterparties | As many as it takes to get the trade done | One |
| # of line items | Can be hundred or more | Less about the number of line items, more about the exchange of risk |
| Traded on | Cash price/Spread | Total Net Proceeds |

Embodiments of the present invention allow for a client to choose their desired portfolio on their chosen Order Management System and send those bonds to an electronic trading platform. Once on the trading platform, the liquidity taker can set timing of the trade, the liquidity providers that they desire to quote, and send the trade in a matter of a few clicks. The client can also easily assess the relative value of each dealer's quote, assess the overall costs of the trade across several statistical metrics, and easily identify quotes that may be outliers (e.g., fat finger or too good to be true).

Finally, when the liquidity taker chooses to trade and the dealer agrees, these trades are booked immediately back to their order management systems. The platform handles the pricing or spotting of spread-based trades and also the communication back to all the competing dealers.

The liquidity taker loads bond trades into the Portfolio Trading ticket (e.g., via an API connection, pasting from a spreadsheet, or choosing from the platform's user interface), chooses their dealers and desired timing, and then clicks "Send" to initiate a negotiation. The portfolio trading ticket consists of a screen that shows aggregated portfolio level details/statistics (i.e., previously trading tickets only focused on the economics of the individual line items). This information is available before negotiation is initiated with the dealers.

In certain embodiments, the liquidity taker can exclude bonds from the negotiation after it has been sent to the dealer. In that scenario, the statistics and calculations are changed when users alter the makeup of the portfolio to only reflect what the user would like to consider to remain in the portfolio at that point in time. A liquid provider may also quote a subset of the requested bonds and easy selection buttons as discussed below are provided on the liquidity taker side to exclude items not quoted from the calculations. The liquidity taker can use the system to easily do an analysis to compare portfolio quotes that do not contain the same sets of bonds from the interface. The liquidity taker can choose different quote types (including Spread, Price, Money Market Yield and Discount Margin) on individual bonds and to compare portfolio level quotes that contain multiple quote types. The liquidity taker can request both bids and offers within the same portfolio trade and compare quotes from dealers to multiple pricing feeds and pricing that can be input by the user themselves. Comparisons can also be available at the portfolio level and at the individual line item level.

In one embodiment, as explained in more detail below, a summary area is provided in the interface to allow the comparison of dealers' quotes based on net proceeds, price or spread—with a "BEST" indicator based on the best net proceeds. The liquidity taker can also utilize the system to send messages to dealers to ask them to improve or change their quotes (to "counter"), and the ability to paste counters levels into the spreadsheet. Once a trade is consummated, an enhanced post-trade feed is included that shows total net proceeds on the entire portfolio as competing quotes, as opposed to individual line item competing quotes on each traded item. In one embodiment portfolio trades can also be including in multi-client net spotting which create post-trade efficiencies for both the dealer and client.

An exemplary transaction flow will now be described according to one embodiment of the present invention. A buy-side client who wants to receive bids for a portfolio sends a list of a portfolio of x number of items to one or more dealers. In the example described herein the client's list contains twenty items which is sent to two dealers. Dealer 1 provides a quote for 19 of the 20 items and Dealer 2 provides a quote for 19 of the 20 items. In this example each dealer elects to omit a different item. For example, Dealer 1 does not price bond ABC and Dealer 2 does not price bond XYZ. In the prior art systems in the above scenario the client has two quotes for a portfolio which are difficult to compare, because even though they contain 18 of the same items, the 19th priced item for each dealer is not the same. One can appreciate that if the number of dealers increases and/or the size of the portfolio or the number of items that are priced or omitted increase this difficulty will exponentially multiply. Embodiments of the present invention allow for various methods for the client to analyze the quotes in real time and execute a better informed portfolio trade.

Figure 5:
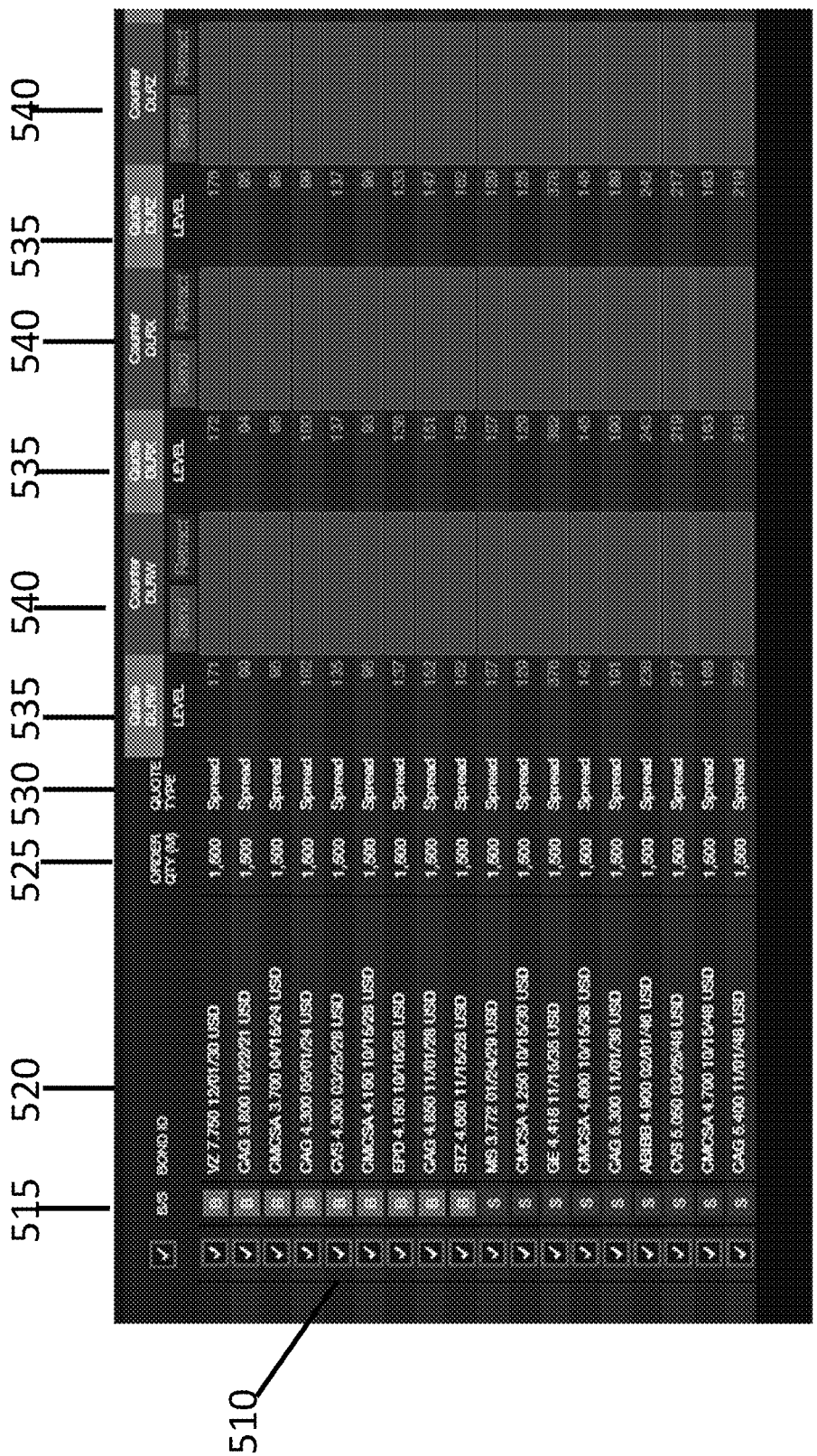
FIG. 5 shows a portion of the bond detail area of FIG. 4.

In one embodiment the client has the ability through interface 400 as shown in FIG. 5 to "uncheck" items in the portfolio to remove them from the pricing analysis to see which dealer is priced best on the commonly quoted items. This allows the client the ability to price items from the various dealers before factoring in the items that are not commonly quoted. In the example above, the client would uncheck bond ABC and bond XYZ to review the portfolio of the 18 commonly quoted items. This would seamlessly allow the client to determine which dealer is showing the best quote for this "sub-portfolio". As seen in FIG. 6B, area 410 of interface 400 gives the client several statistics to make this determination, such as Net Proceeds, Weighted Average Spread, Weighted Average Price and Weighted Average Yield.

In one embodiment, a client can enter proposed "Counters" for items that were not quoted and request levels for these bonds. A client would have the option to send the counters to the dealer or simply use the counter number for this level of the analysis. The levels entered into the counter area 540 of interface 400 are used to replace dealer quotes and compute portfolio level analytics in hypothetical area 430. In this case, counters can be used to replace unquoted items from the dealer and create a pricing schema that allows the client to compare all or any subset of items in the portfolio.

In the above example, if the client wanted to compare the entire portfolio with counter prices for the omitted items, the client would keep the entire 20 items "selected" and enter counter levels for both Dealer 1 bond ABC and Dealer 2 bond XYZ. The hypothetical area 430 of interface 400 would then be populated with complete portfolio—level analytics—using each dealers' 19 quotes and the 20th quote being a level that the client thinks they would be able to execute in the market (i.e., the counter).

In one embodiment a client can send counters to each dealer to ask them to meet their target levels on any particular bond. In the above example, the client may choose to send counters to either Dealer 1 or Dealer 2 for the respective missing bond or could send different counter levels on different bonds to each dealer. The counter is presented to the dealer as a target level for the client and the dealer can meet the level, requote the bond(s) or do nothing. If the dealer(s) update their quotes, the client can be presented in the interface the portfolio level analytics based on the new quotes.

Regardless of what was quoted or if a counter was made, in one embodiment if the client is not happy with the levels they got back from dealer, they can attempt to execute a subset of the portfolio. In the above example, in the scenario where the client counters both Dealer 1 and Dealer 2 on their respective missing bonds and the dealers decide to fill in their quotes each have now quoted the entire 20 item portfolio. The client may then decide that the quotes they received from both Dealer 1 and Dealer 2 on a 3rd bond (e.g., bond DDD) do not meet their target level. The client can counter on this bond as well, but if neither dealer chooses to improve the client can still uncheck bond DDD to analyze dealer quotes on the remaining items in the portfolio. The client can present the remaining portfolio of 19 items (excluding bond DDD) to the best dealer for execution. The chosen dealer will be presented with the modified 19 item portfolio for execution—at which point the dealer can decide whether or not to accept the modified portfolio for trading.

Figure 12:
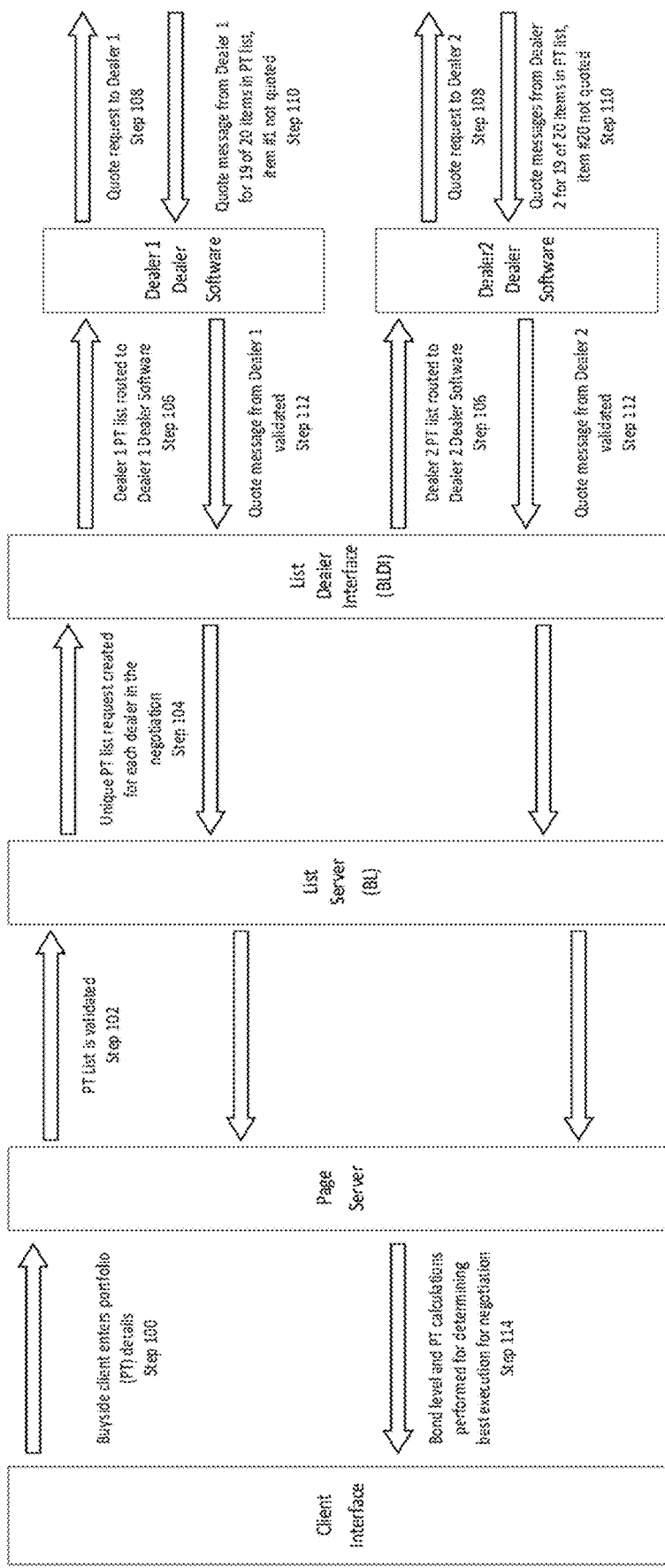
FIG. 12 shows a flow diagram of quoting and negotiation according to one embodiment of the present invention.

A depiction of the flow of a transaction according to one embodiment of the present invention utilizing the above discussed example will now be discussed in reference to FIG. 12. A client enters portfolio details (Step 100) which can include by non-limiting example one or more of the following bond, direction, sizes for each item, a listing or criteria for dealers and a due-in time which can be sent to a server. The portfolio list can then be validated (Step 102) by the trading platform. If there is more than one dealer, a unique portfolio list request can be created for each dealer (Step 104). Each dealer's respective portfolio list can be concurrently sent to that dealer's dealer software (Step 106) where a quote can be requested (Step 108). Each dealer can then provide a quote message for any or all of the items in the portfolio lists (Step 110). Each of the quote messages are then validated (Step 112) and passed back through the system so that calculations can be performed to present to the client (Step 114).

Figure 13:
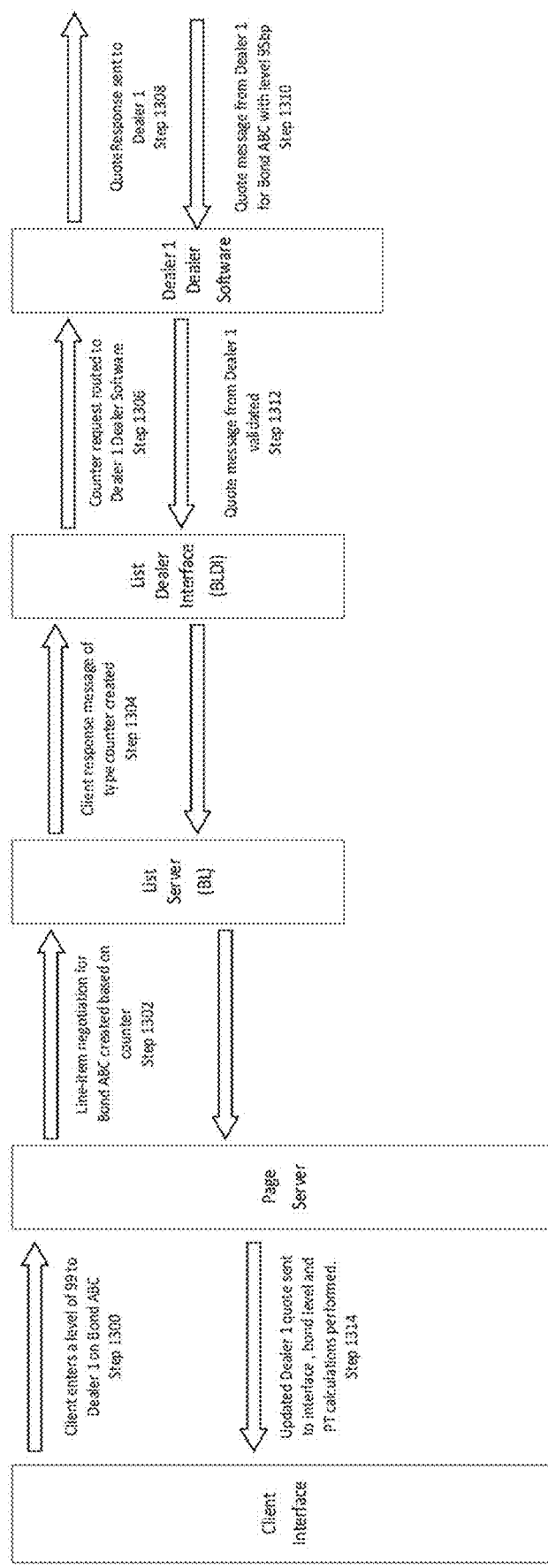
FIG. 13 shows a flow diagram of presenting a counter offer according to one embodiment of the present invention.

A depiction of the flow of a transaction according to one embodiment of the present invention utilizing the above discussed example where a client provides a counter to Dealer 1 will now be discussed in reference to FIG. 13. In this example, the client enters a counter of 99 bp for bond ABC which Dealer 1 did not originally quote (Step 1300). A line item negotiation is set up for bond ABC based on client's counter (Step 1302). A client response message of the type "counter" is created to be passed on to Dealer 1 (Step 1304). The counter message is routed to Dealer 1 dealer software (Step 1306) and a quote response is sent to Dealer 1 which includes the proposed counter level of 99 bp (Step 1308). A quote message is then generated by Dealer 1 (Step 1310). In this example, Dealer 1 proposes 95 bp. The quote message is then validated (Step 1312) and passed back through the system so that Dealer 1's quote can be updated to include Bond ABC and calculations can be performed to present to the client (Step 1314).

Figure 14:
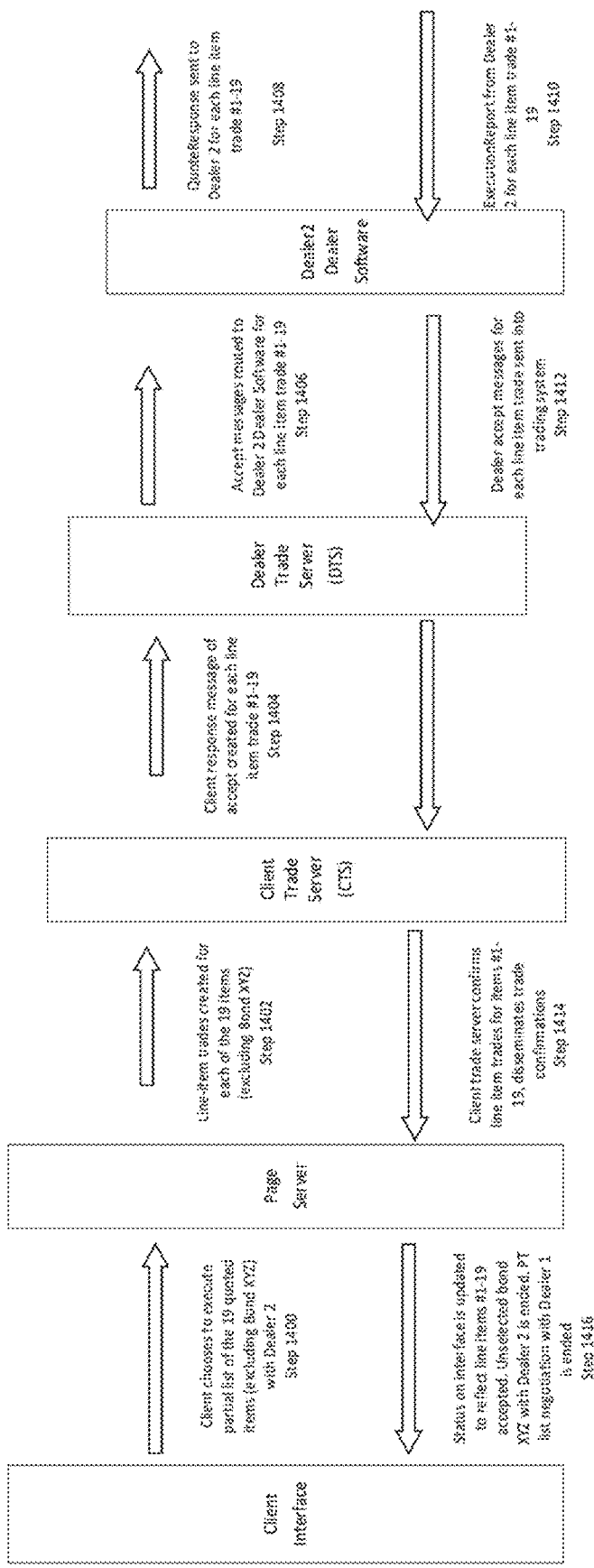
FIG. 14 shows a flow diagram of executing a sub-portfolio according to one embodiment of the present invention.

A depiction of the flow of a transaction according to one embodiment of the present invention utilizing the above discussed example where a client elects to execute a partial portfolio (i.e., sub-portfolio) will now be discussed in reference to FIG. 14. In this example the client chooses to execute a portfolio of only 19 bonds with Dealer 2 (Step 1400). Line item trades are created for each of the items in the portfolio (e.g., all of the items other than bond XYZ) (Step 1402). A client response message of the type "accept" is created for each of the 19 line item trades (Step 1404). The accept messages are routed to Dealer 2 dealer software (Step 1406) and a quote response is sent to Dealer 2 which includes instructions to execute at the Dealer 2 quoted level (Step 1408). An execution report for each of line items 1-19 is generated (Step 1410). A dealer accept message is then sent through the trading platform (Step 1412). The client trader server confirms the line item trades for each of the items and disseminates the trade confirmations (Step 1414). The status on the client's interface is updated to reflect the 19 accepted items and the negotiation for unselected bond XYZ with Dealer 2 is ended. The PT list negotiation with all other dealers is also ended (Step 1416).

Figure 2:
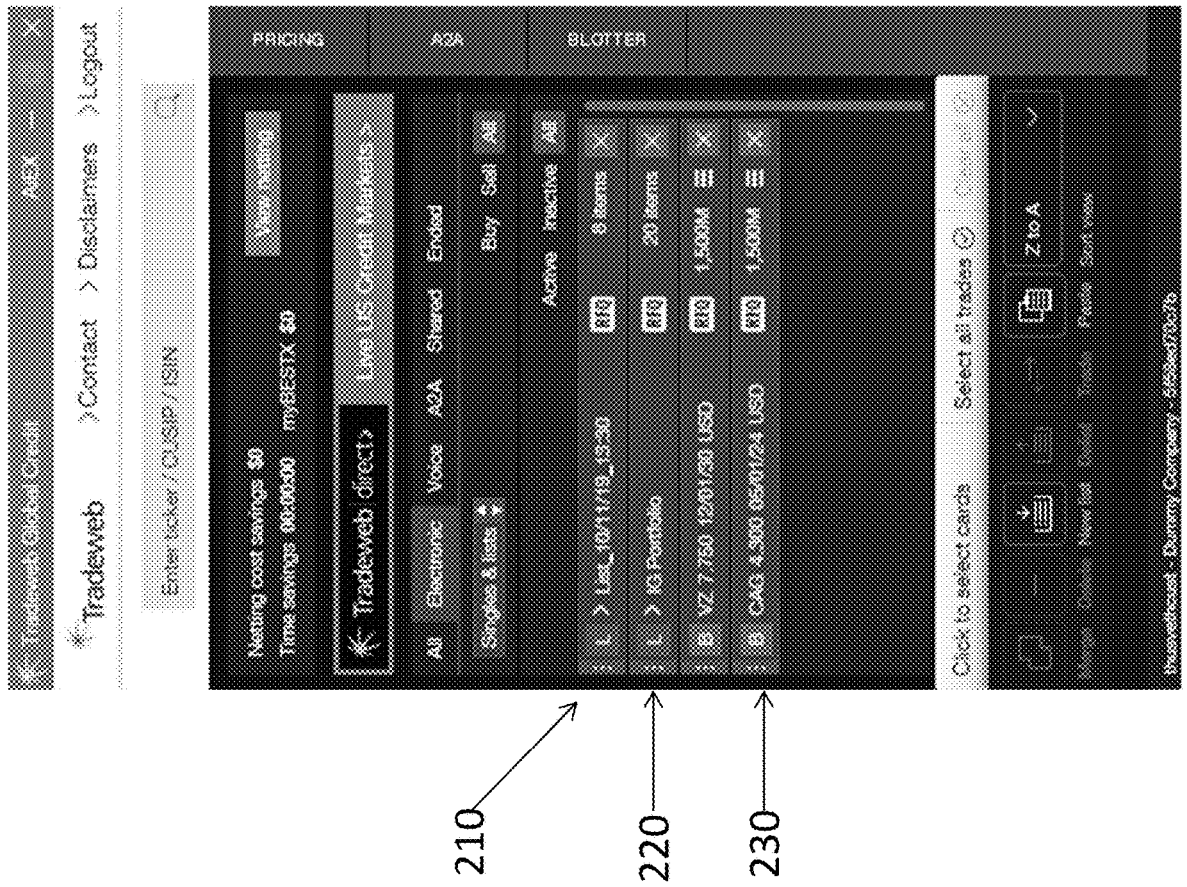
FIG. 2 shows an example of a pre-trade interface according to some embodiments of the present invention.
Figure 3:
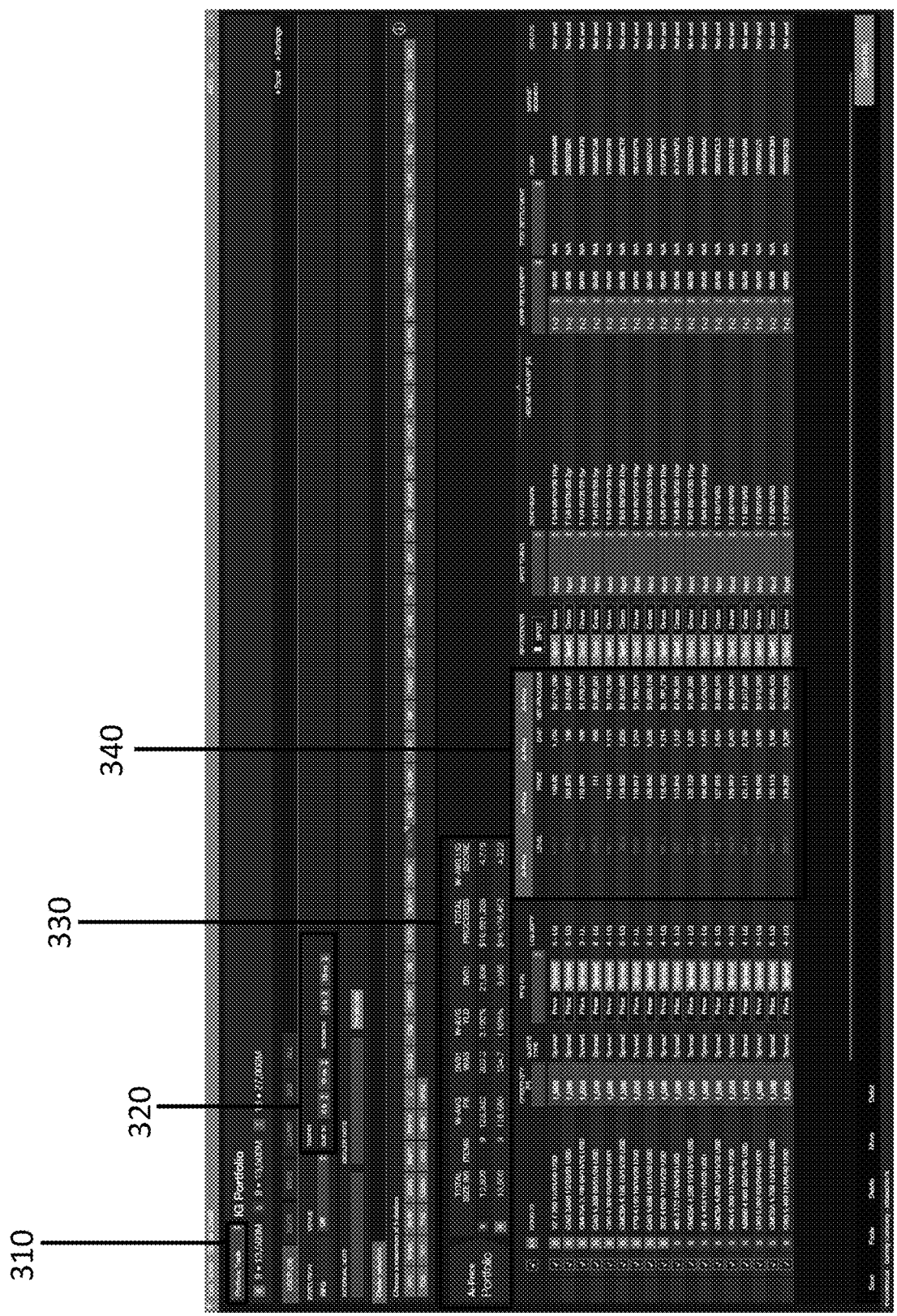
FIG. 3 shows a pre-trade interface according to some embodiments of the present invention.

FIGS. 2 and 3 show an example of a pre-trade state of portfolio trading according to one embodiment of the present invention. FIG. 2 shows an exemplary credit docket user interface 200. The client selects or provides a listing bonds that they would like to trade via FIX messaging or other mode of communication. These trades appear as a list 210 in the docket, which is a staging area. Lists of bonds appear with an "L" tile 220. Individual Bonds appear with a "B" or "S" 230. The user can double-click on any item to open the ticket and begin negotiation.

FIG. 3 highlights key features of the portfolio trading mode via a user pre-trade interface 300. As indicated, the following features and information are provided: Toggle from List to Portfolio Trade using toggle box 310; Due-in and trading Session Timer 320; Portfolio Level Statistics based on Ai-Price pane 330; and Bond Level detail from Ai-Price pane 340.

In the interface as discussed in more detail below, data can be listed for orders in the list. Exemplary definitions of these rows/columns are as follows:

Total Size: Sum of the Order Quantity for Buys and Sells in the list

Items: Total Items for Buys and Sells in the list

W-AVG PX: Volume weighted average price (Price is from Ai-Price)

DV01 WAS: DV01 weighted average spread (Spreads and DV01s are from Ai-Price)

W-AVG YLD: DV01 weighted average yield (Yields and DV01 weighs are from Ai-Price). When the client has chosen to trade on spread (to U.S. Treasuries) for bond(s) in the portfolio, the platform uses a combination of spreads from Ai-Price and a treasury feed to compute the real-time Price, DV01, Proceeds, Yield)

DV01: Sum of the DV01 for buys and sells

Total Proceeds: Total "dirty" proceeds (accrued interest included in the proceeds calculation) computed from Ai-Price. When the client has chosen to trade on Spread (to U.S. Treasuries) for bond(s) in the portfolio, a combination of spreads from Ai-Price and a propriety Treasury feed can be used to compute the real-time Price, DV01, Proceeds and Yield W-AVG LIQ SCORE: Volume weighted average liquidity score. Liquidity scores are created by the platform using a proprietary algorithm. In some embodiments, the algorithm ranks bonds by average daily volume traded in recent past history and then allocates those bonds into buckets from 1 (least liquid) to 10 (most liquid). In other embodiments, different methods of quantifying corporate bond liquidity may be used, for example, methods that would take into account factors other than average volume traded The Bond Level Detail rows/columns are defined as follows:

Check Box: Check box for inclusion in portfolio statistics above

B/S: Direction of the trade for that bond (Buy/Sell)

Bond ID: Description of bond including Ticket, Coupon, Maturity, Currency

Order QTY: Amount of the bond to be traded

Quote Type: Quote type selected (See RFQ On)

RFQ ON: Client can choose to receive quotes on Spread, Price, Discount Margin, or Money Market Yield Liquidity: A proprietary liquidity score Ai-Price LEVEL: Ai-Price level in the quote type selected by the client (bid side of client is selling, offer side if buying)

Ai-Price PRICE: Ai-Price Price based on the Level in the previous column and a U.S. Treasury feed, where applicable Ai-Price DV01: Ai-Price DV01 based on the Level Ai-Price NET PROCEEDS: Ai-Price Net Proceeds based on the quantity, Ai-Price and any accrued interest for the bond Spot/Cross: Client can choose whether to spot or cross (trade Treasuries along with corporates) for spread-quoted bonds Spot Timing: If Client chooses to spot, they can choose a spot timing or Spot Later.

Benchmark: US Treasury Benchmark bond for Spread quoted trades.

Hedge Amount: If Client chooses to Cross Treasuries then this would be the amount of US Treasury Benchmark that would trade.

Corp Settlement: Corporate Bond Settlement

TRSY Settlement: US Treasury Settlement

CUSIP: CUSIP Identifier for the bond

In other embodiments, rows, columns, and/or definitions different or in addition from those given in the example above and described may be provided in the Ai-Price Portfolio and/or Bond Level Detail areas without departing from the spirit of the invention.

Figure 4:
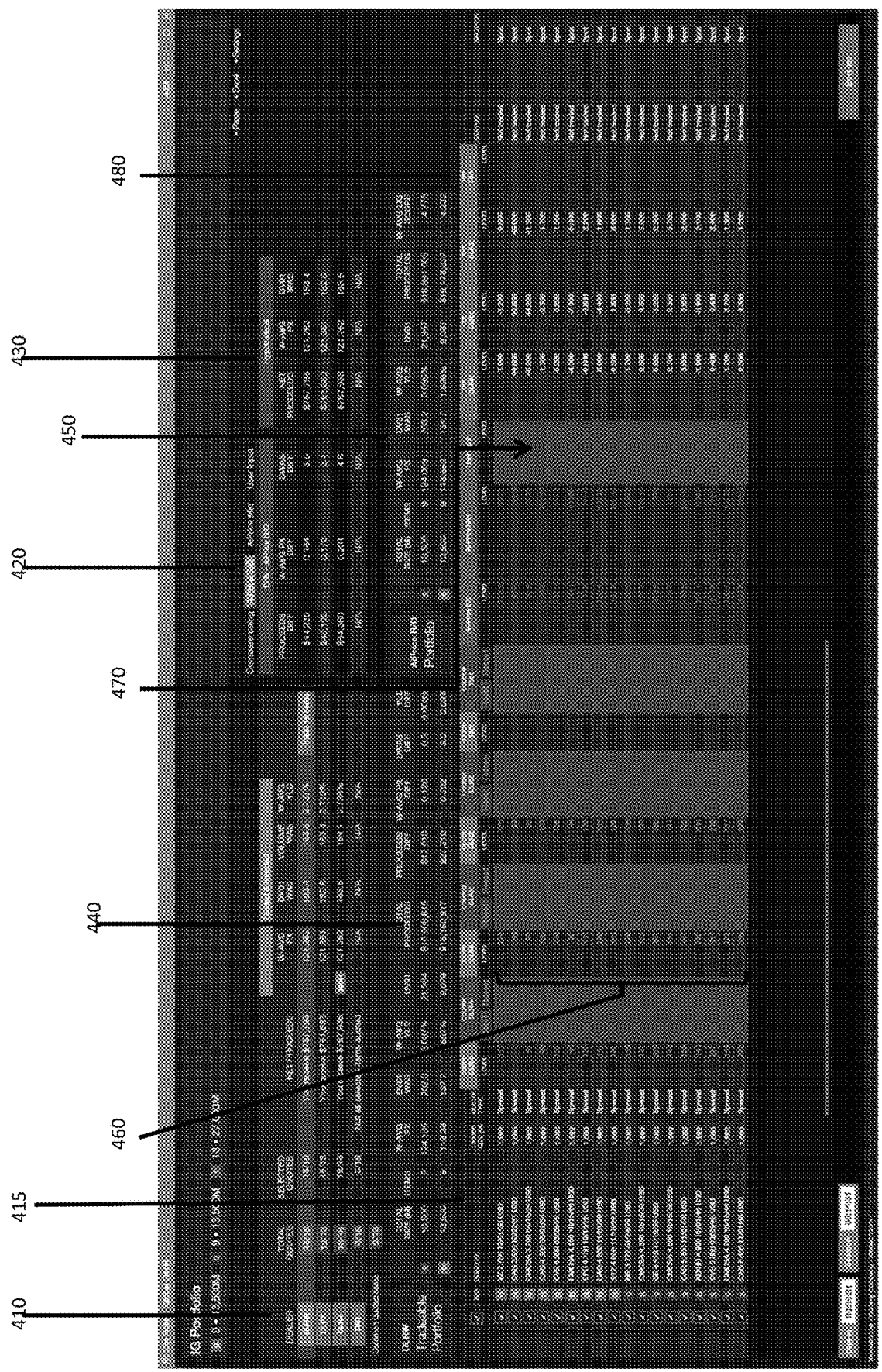
FIG. 4 shows a portfolio trading negotiation interface, according to some embodiments of the present invention.

FIGS. 4-10 show interfaces as part of an exemplary Portfolio Trading Negotiation. FIG. 4 shows negotiation interface 400 which highlights key features/areas of the negotiation screen, which include, as indicated: All Dealers Quote Summary area 410; Bond Level Detail area 415; Portfolio-Level Difference from Pricing Source and Pricing Source Toggle 420; Hypothetical Pricing (using Quotes and Counters) area 430; Individual Dealer Quote Summary area 440; Model Portfolio Summary area 450; Individual Bond Quotes from Each Dealer area 460; User Input Levels area 470; and Bond-Level Difference from Source area 480, which are described further below.

FIG. 5 shows a partial more detailed view of the Bond Level Detail area 415 of interface 400. As shown in FIG. 5 the user can select or deselect items that they want to remain or remove from the portfolio by clicking on the check boxes 510 of the bond detail area. In some embodiments, calculations in the ticket will only consider the items that remain checked or otherwise selected throughout negotiation. The ability to uncheck items allows the client the ability to optimize the execution (by removing some items where pricing may not suit), compare quotes from one dealer to another that may not have the same items quoted, or do scenario analysis around execution quality. Column 515 shows whether it is buy or sell, column 520 shows the bond ID, column 525 shows the order quantity, column 530 shows the quote type, column 535 shows the various dealer quotes and column 540 is where the user can provide and send a counter to the quote. This information can be sortable by the client.

For instance, in the example shown in FIG. 6A which shows a more detailed view of the summary area 410 of interface 400, the user has chosen 18 items to price and three dealers have provided quotes for all 18 items while one dealer "TW1" has only provided quotes on 17. In area 410, the rows/columns are as follows (but may vary in other embodiments). Dealer column 610 shows the dealer acronym and clicking on a dealer acronym from column 610 can be used by the client to select a dealer for trading or to show more detail as described below in the individual dealer summary shown in FIG. 8. Total Quotes column 615 lists the total number of items quoted by the particular dealer. Selected Quotes column 620 shows the total selected items quoted by that dealer. Net Proceeds column 625 which displays the total net proceeds based on each dealer's quoted levels and selected items. The "BEST" Indicator 630 highlights which dealer's quote has best net proceeds for client (lowest payment/highest receive). W-AVG PX column 635 shows the Volume Weighted Average Price based on each dealer's quotes and selected items. This is based on treasury pricing, if applicable. DV01 WAS column 640 shows the DV01 weighted average spread based on each dealer's quotes and selected items. Volume WAS column 645 shows the Volume weighted average spread based on each dealer's quotes and selected items. W-AVG YLD: DV01 column 650 shoes the weighted average yield based on each dealer's quotes and selected items. This is based on treasury pricing, if applicable. Trade Button 655 is used to trade N Items where N is the number of selected items.

In column 620 the user can see the number of quotes that were provided. In column 625 the user can see the net proceeds if a trade is executed for all 18 bonds. Since dealer "TW1" only quoted 17/18 items, the client could not compare their quote to the others. If the user selects only 17 items as shown in FIG. 6B, the client can compare TW1's quote to those of the other dealers that quoted all items in column 625.

Figure 7:
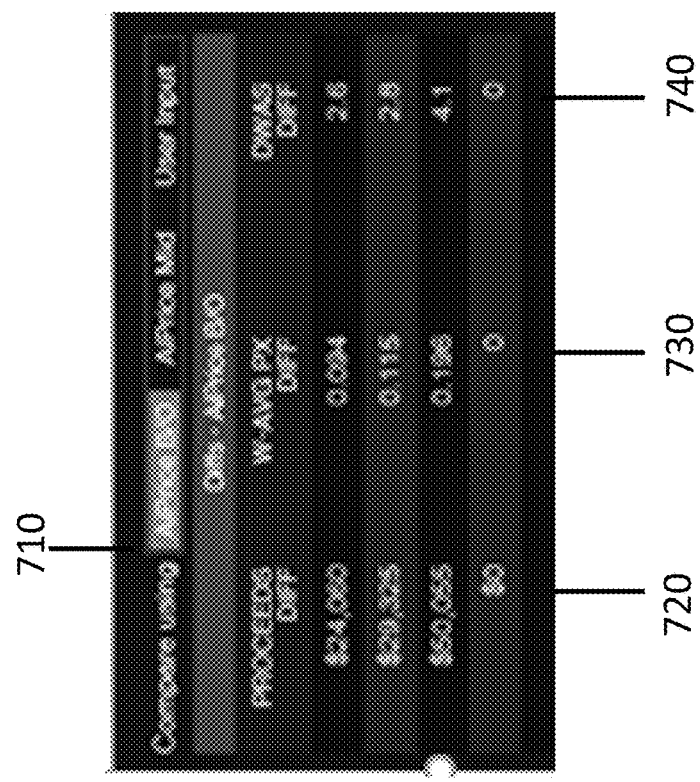

FIG. 7 shows a more detailed view of the Portfolio-Level Difference from Pricing Source and Pricing Source Toggle area 420 of interface 400. The rows/columns are as follows (but may vary in other embodiments). "Compare Using" toggle 710 allows the client to choose AiPrice Bid/Offer, AiPrice Mid, or a source of their own choosing which can be pasted to the ticket. PROCEEDS DIFF column 720 shows the difference between the proceeds of the dealer's quote and that of the pricing source used. W-AVG PX DIFF column 730 shows the difference between the weighted average price of the dealer's quote and that of the pricing source. DWAS DIFF column 740 shows the difference between the DV01 weighted average spread from the dealer's quote and that of the pricing source.

Figure 8:
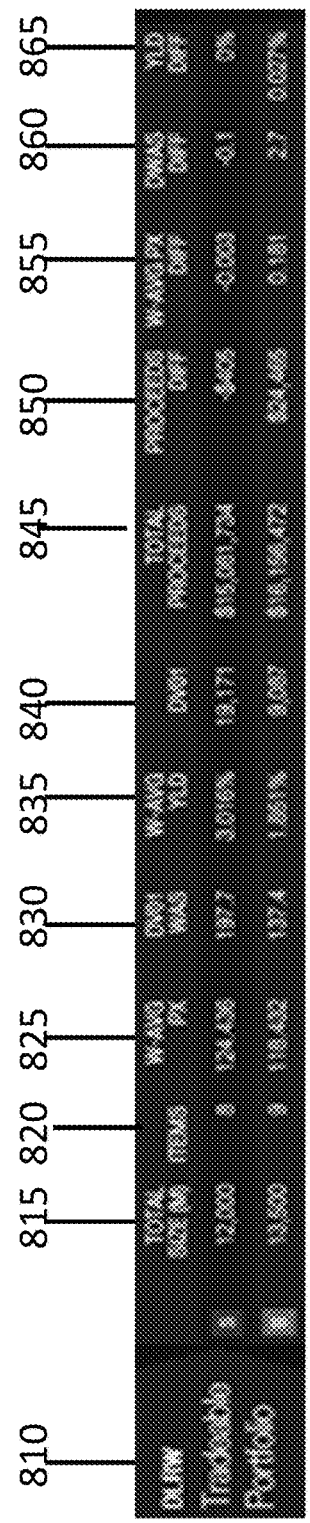

FIG. 8 shows a more detailed view of the Individual Dealer Quote Summary area 440 of interface 400. For a selected dealer (selected via dealer column 610), the client can inspect the statistics for buys and sells for that dealer. The rows/columns are as follows (but may vary in other embodiments). Dealer Tradeable Portfolio column 810 shows the selected dealer's acronym. Total Size column 815 shows the total quantity of selected items quoted by that dealer. Items column 820 shows the total number of selected items quoted by the selected dealer. W-AVG PX column 825 shows the volume weighted average price based on each dealer's quotes and selected items. This is based on treasury pricing, if applicable. DV01 WAS column 830 shows the DV01 weighted average spread based on each dealer's quotes and selected items. W-AVG YLD column 835 shows the DV01 weighted average yield based on each dealer's quotes and selected items. This is based on treasury pricing, if applicable. DV01 column 840 shows the total sum of DV01 of all selected items quoted by that dealer. Total proceeds column 845 shows the total proceeds based on each dealer's quoted levels and selected items. Proceeds Diff column 850 shows the difference between the proceeds of the dealer's quote and that of the pricing source used. W-AVG PX DIFF column 855 shows the difference between the Weighted Average Price of the dealer's quote and that of the pricing source. DWAS DIFF column 860 shows the difference between the DV01 weighted average spread from the dealer's quote and that of the pricing source. YLD DIFF column 865 shows the difference between the DV01 weighted average yield from the dealer's quote and that of the pricing source.

Figures 9, 10:
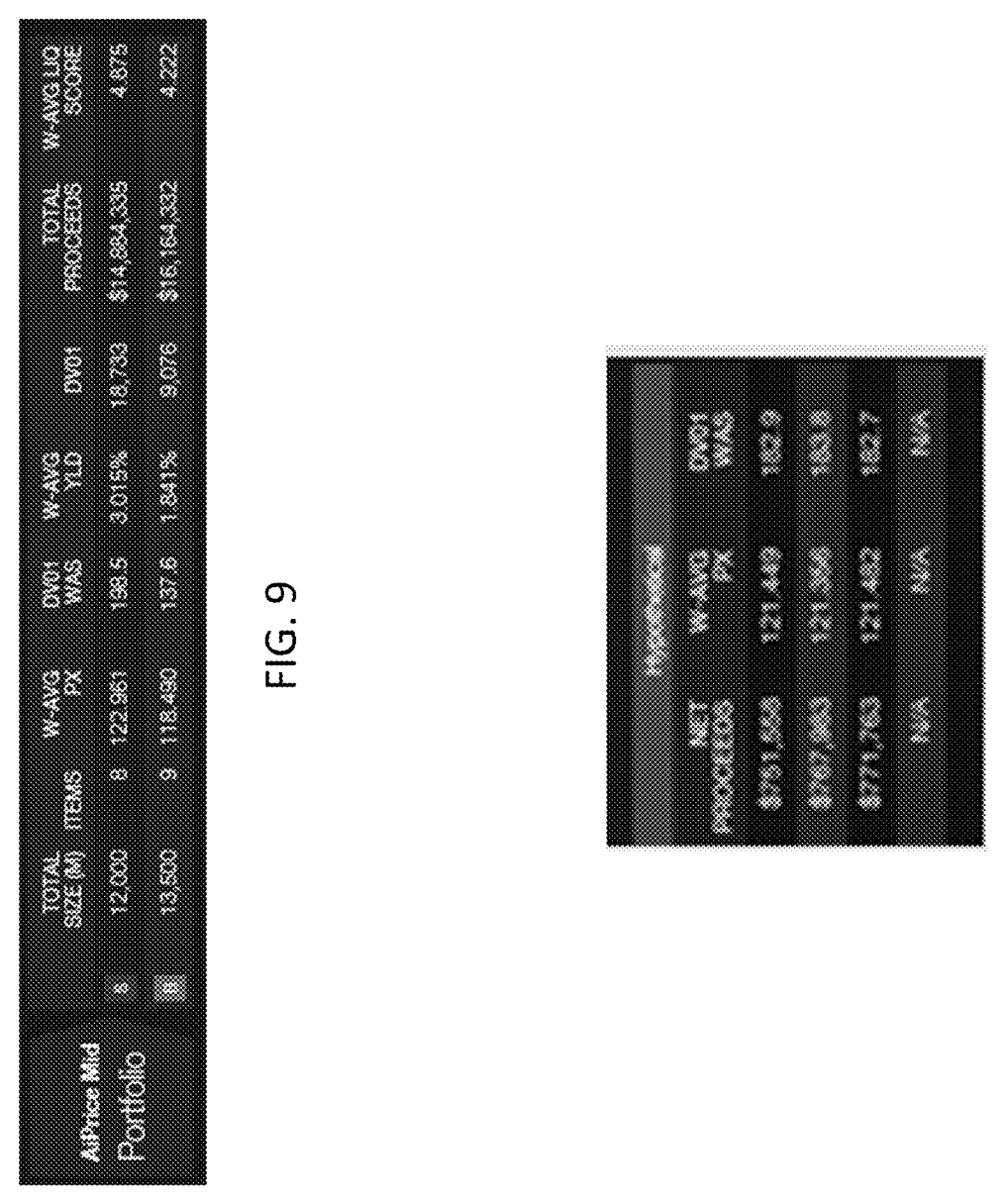

FIG. 9 shows a more detailed view of the Model Portfolio Summary area 450 of interface 400. As described above in connection with the FIG. 7, the "Compare Using" Toggle 710 allows the client to choose AiPrice Bid/Offer, AiPrice Mid, or a source of their own choosing which can be pasted to the ticket. This toggle determines which source is used to show summary statistics in this area 450. The statistics in this area are the same in pane 330 of interface 300. If AiPrice Mid is chosen from the toggle (for example) the statistics are based on Mid (see FIG. 9).

FIG. 10 shows a more detailed view of the Hypothetical Pricing (Using Quotes and Counters) area 430 of interface 400. This area is intended to allow a client to do some scenario analysis with the quotes that he has been provided. The calculations in this area are for selected items and use the dealer quotes, unless there are values in the respective counter column 540 for that particular dealer. If there are values in counter, then the counter is used instead of the dealer's quote.

In the example shown in FIG. 10, the last dealer (TW1) has not quoted all 18 items and therefore a full portfolio quote cannot be computed for that dealer. If the client entered a level in the counter for TW1 for the one item not quoted, then the hypothetical area takes in this value and uses it to complete the quote and calculate the statistics.

Figure 11:
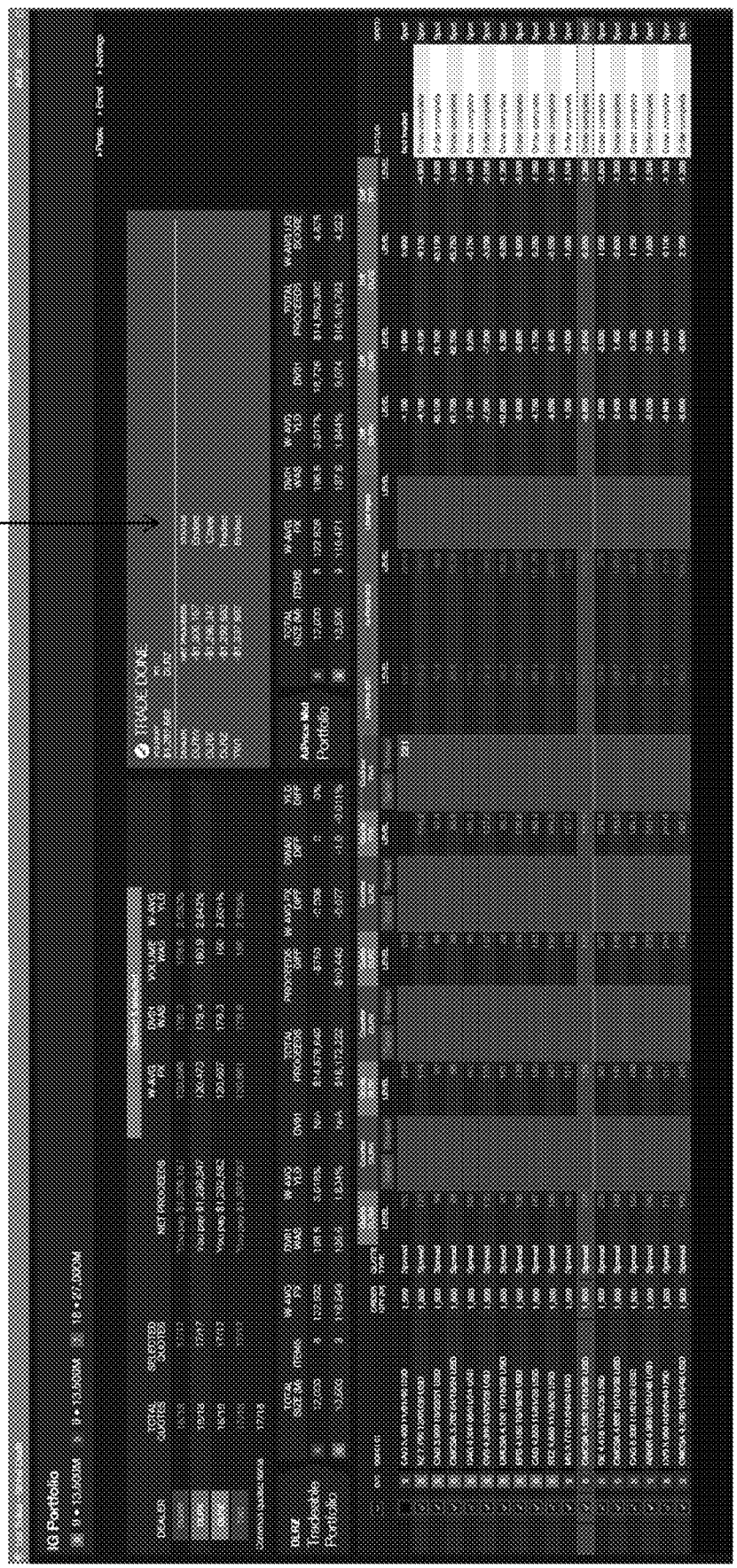
FIG. 11 shows a post-trade interface according to some embodiments of the present invention.

FIG. 11 shows an example of a Portfolio Trading screen Post-Trade. Dealer quotes (in terms of Net Proceeds) are displayed. Best quote, Cover Quote, and other competing quotes are shown on the interface 1100 and also sent back to the client's OMS. The status column 1110 for each line item is updated to 'Order Complete' or 'Not Traded' to clearly show which items were traded.

The software functions of the computerized electronic trading system and method described herein may be programmed via application software, system software or any combination thereof, and may be executable on one or more hardware components within the system, external to the system or some combination thereof. In some embodiments, system and/or application level software may reside on system hardware, various external computer systems, or some combination thereof.

Similarly, the implementation of various software functions described herein may at times overlap. In various embodiments, some software components may be stored in hardware residing within the system, external to the system or some combination thereof. For example, in some embodiments a software implementation may consist of a stand-alone application installed on a mainframe computer. In other embodiments, certain aspects may reside on client or dealer hardware programmed to communicate with the trading system and method. Accordingly, the present invention will be understood to include those variations as would be understood by a person of ordinary skill in the art having the benefits of the present disclosure.

It should be noted that references herein to phrases such as "one embodiment" or "an embodiment" mean that a particular feature, structure or characteristic described in connection with the embodiment is included in at least one embodiment of the invention. The phrases such as "in one embodiment" or "in certain embodiments" in various places in the specification are not necessarily, but can be, referring to the same embodiment. Use of the term "preferred" or "preferably" is intended to indicate a configuration, set-up, feature, process, or alternative that may be perceived by the inventor(s) hereof, as of the filing date, to constitute the best, or at least a better, alternative to other such configurations, set-ups, features, processes, or alternatives. In no way shall the use of the term "preferred" or "preferably" be deemed to limit the scope of the claims hereof to any particular configuration, set-up, feature, process, or alternative.

It will be further appreciated by those skilled in the art that the appended figures are purely illustrative, and that the system may be implemented in any number of ways, by the actual designers, as long as the functionality as described above, stays intact.

While there have been shown and described fundamental novel features of the invention as applied to the preferred and illustrative embodiments thereof, it will be understood that omissions and substitutions and changes in the form and details of the disclosed invention may be made by those skilled in the art without departing from the spirit of the invention and the broad inventive concept thereof. Moreover, numerous modifications and changes may readily occur to those skilled in the art. For example, various features and structures of the different embodiments discussed herein may be combined and interchanged. Hence, it is not desired to limit the invention to the exact construction and operation shown and described and, accordingly, all suitable modification equivalents may be resorted to falling within the scope of the invention as claimed.

The invention claimed is:

1. A computer-implemented method for electronic portfolio trading of corporate bonds using a computer system capable of communication with one or more client computers and one or more dealer computers across a trading platform, the method comprising:
   causing to display on the client computer a pre-trade interface, the pre-trade interface designed and configured to receive one or more inputs related to one or more bonds to create a portfolio list;
   receiving through the pre-trade interface a request from a client, the request comprising data relating to bonds to create a portfolio;
   generating through the trading platform a portfolio list based on the data received from the client;
   transmitting through the trading platform the portfolio list to the one or more dealer computers;
   receiving through the trading platform from the one or more dealer computers quotes relating to one or more of the bonds that comprise the portfolio of bonds that are displayed in the portfolio list;
   causing to display on the client computer a negotiation interface, the negotiation interface designed and configured to display the portfolio list and pricing data based on the received quotes and to dynamically provide updated portfolio level pricing data and portfolio level analytic information for the portfolio list based on inputs received from the client, wherein when a client deselects an item from within the portfolio list the portfolio level pricing data and portfolio level analytic information is dynamically updated in real time to reflect a sub-portfolio that comprises each of the items in the portfolio list other than the deselected item, wherein the portfolio level analytic information comprises one or more of the following: weighted average price and yield, composite difference, and DV01, and wherein the client deselects the item based on commonly quoted items between or among the received quotes;
   receiving through the trading platform a request to trade the items in the sub-portfolio from the client computer based on a selected dealer's quotes; and
   executing a transaction through the trading platform for the sub-portfolio between the client and the selected dealer.

2. The method of claim 1 wherein the portfolio list is generated based on data from the trading platform.

3. The method of claim 1 wherein the data relating to the portfolio includes a listing of one or more dealers.

4. The method of claim 1 where the data relating to the portfolio includes desired timing related to a trade.

5. The method of claim 1 wherein the pricing data comprises one or more of the following: net proceeds, weighted average spread, weighted average price and weighted average yield.

6. The method of claim 1 further comprising
   receiving through the pre-trade interface a counter offer from a client, the counter offer related to the pricing of one the one or more bonds that comprise the portfolio.

7. A non-transitory computer program product, comprising a computer usable medium having stored therein instructions that, when executed by at least one processor, configure one or more computers of an electronic trading system to:
   display on a client computer a pre-trade interface, the pre-trade interface designed and configured to receive one or more inputs related to one or more bonds to create a portfolio list;
   receive through the pre-trade interface a request from a client, the request comprising data relating to bonds to create a portfolio;
   generate through a trading platform a portfolio list based on the data received from the client;
   transmit through the trading platform the portfolio list to the one or more dealer computers;
   receive through the trading platform from the one or more dealer computers quotes relating to one or more of the bonds that comprise the portfolio of bonds that are displayed in the portfolio list;
   cause to display on the client computer a negotiation interface, the negotiation interface designed and configured to display the portfolio list and pricing data based on the received quotes and to dynamically provide updated portfolio level pricing data and portfolio level analytic information for the portfolio list based on inputs received from the client, wherein when a client deselects an item from within the portfolio list based on commonly quoted items between or among the received quotes, the portfolio level pricing data and portfolio level analytic information is dynamically updated in real time to reflect a sub-portfolio that comprises each of the items in the portfolio list other than the deselected item, wherein the portfolio level analytic information comprises total proceeds, weighted average price and yield, composite difference, and DV01;

receive through the trading platform a request to trade the items in the sub-portfolio from the client computer based on a selected dealer's quotes; and execute a transaction through the trading platform for the sub-portfolio between the client and the selected dealer.

8. The non-transitory computer program product of claim 7 wherein the portfolio list is generated based on data from the trading platform.

9. The non-transitory computer program product of claim 7 wherein the data relating to the portfolio includes a listing of one or more dealers.

10. The non-transitory computer program product of claim 7 wherein the data relating to the portfolio includes desired timing related to a trade.

11. The non-transitory computer program product of claim 7 wherein the pricing data comprises one or more of the following: net proceeds, weighted average spread, weighted average price and weighted average yield.

12. The non-transitory computer program product of claim 7 wherein the one or more computers of an electronic trading system are further configured to:

receive through the pre-trade interface a counter offer from a client, the counter offer related to the pricing of one the one or more bonds that comprise the portfolio.

13. A computer-implemented method for electronic portfolio trading of corporate bonds using a computer system capable of communication with one or more client computers and one or more dealer computers across a trading platform, the method comprising:

causing to display on the client computer a pre-trade interface, the pre-trade interface designed and configured to receive one or more inputs related to one or more bonds to create a portfolio list;

receiving through the pre-trade interface a request from a client, the request comprising data relating to bonds to create a portfolio;

generating through the trading platform a portfolio list based on the data received from the client;

transmitting through the trading platform the portfolio list to the one or more dealer computers;

receiving through the trading platform from the one or more dealer computers quotes relating to one or more of the bonds that comprise the portfolio of bonds that are displayed in the portfolio list;

causing to display on the client computer a negotiation interface, the negotiation interface designed and configured to display the portfolio list and pricing data based on the received quotes and to dynamically provide updated portfolio level pricing data and portfolio level analytic information for the portfolio list based on inputs received from the client, wherein when a client deselects an item from within the portfolio list the portfolio level pricing data and portfolio level analytic information is dynamically updated in real time to reflect a sub-portfolio that comprises each of the items in the portfolio list other than the deselected item, wherein the portfolio level analytic information comprises total proceeds, weighted average price and yield, composite difference, and DV01, and wherein the client deselects the item based on commonly quoted items between or among the received quotes;

receiving through the trading platform a request to trade the items in the sub-portfolio from the client computer based on a selected dealer's quotes; and executing a transaction through the trading platform for the sub-portfolio between the client and the selected dealer.

* * * * *